United States Patent
Sharan et al.

(10) Patent No.: US 8,669,941 B2
(45) Date of Patent: Mar. 11, 2014

(54) METHOD AND APPARATUS FOR TEXT ENTRY

(75) Inventors: Santosh Sharan, Acton, MA (US);
Amnon Gavish, Newton, MA (US);
Greg Sigel, Kentfield, CA (US); Gordon Kessler, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 1124 days.

(21) Appl. No.: 12/500,675

(22) Filed: Jul. 10, 2009

(65) Prior Publication Data

US 2010/0171700 A1     Jul. 8, 2010

Related U.S. Application Data

(60) Provisional application No. 61/142,459, filed on Jan. 5, 2009.

(51) Int. Cl.
*G06F 3/02* (2006.01)
*G06F 3/041* (2006.01)
*G06F 3/048* (2013.01)

(52) U.S. Cl.
USPC ........... 345/168; 345/173; 345/169; 345/161; 715/773

(58) Field of Classification Search
USPC ............... 345/156–173; 341/22–24; 715/867, 715/864, 851, 857, 858, 840, 825–826, 816, 715/773, 863
See application file for complete search history.

(56) References Cited

U.S. PATENT DOCUMENTS

| | | | |
|---|---|---|---|
| 5,612,690 A | 3/1997 | Levy et al. | |
| 5,748,512 A | 5/1998 | Vargas | |
| 5,818,437 A | 10/1998 | Grover et al. | |
| 5,963,671 A | 10/1999 | Comerford et al. | |
| 6,011,554 A | 1/2000 | King et al. | |
| 6,016,142 A * | 1/2000 | Chang et al. | 715/763 |
| 6,037,942 A * | 3/2000 | Millington | 715/835 |
| 6,104,384 A | 8/2000 | Moon et al. | |
| 6,307,548 B1 | 10/2001 | Flinchem et al. | |
| 6,307,549 B1 | 10/2001 | King et al. | |
| 6,801,190 B1 | 10/2004 | Robinson et al. | |
| 7,088,345 B2 | 8/2006 | Robinson et al. | |
| 7,098,896 B2 | 8/2006 | Kushler et al. | |
| 7,162,694 B2 | 1/2007 | Venolia | |
| 7,175,438 B2 | 2/2007 | Levy | |
| 7,202,853 B2 | 4/2007 | Ng et al. | |
| 7,207,011 B2 | 4/2007 | Mulvey et al. | |
| 7,250,938 B2 | 7/2007 | Kirkland et al. | |
| 7,277,088 B2 | 10/2007 | Robinson et al. | |
| 7,293,231 B1 | 11/2007 | Gunn et al. | |
| 7,324,083 B2 | 1/2008 | Fux et al. | |

(Continued)

OTHER PUBLICATIONS

Tango Product Information, available at www.tengo.net, Copyright 2006.

*Primary Examiner* — Hong Zhou
(74) *Attorney, Agent, or Firm* — Perkins Coie LLP

(57) ABSTRACT

A method and apparatus for text input is provided. The method includes the steps of dividing the letters of a keyboard into a plurality of zones, each zone including one or more letters and designating a jumper key associated with each of the plurality of zones from the letters in each zone. A user indication of a selected jumper key is received, and all of the keys in the zone associated with the selected jumper key are then selected.

31 Claims, 7 Drawing Sheets

(56) References Cited

U.S. PATENT DOCUMENTS

| | | |
|---|---|---|
| 7,430,508 B2 | 9/2008 | Williamson et al. |
| 7,440,889 B1 | 10/2008 | Skiena et al. |
| 7,440,896 B2 | 10/2008 | Williamson et al. |
| 7,457,466 B2 | 11/2008 | Williamson et al. |
| 7,475,004 B2 | 1/2009 | Fux et al. |
| 7,477,238 B2 | 1/2009 | Fux et al. |
| 2004/0066374 A1* | 4/2004 | Holloway et al. ............ 345/168 |
| 2004/0080487 A1* | 4/2004 | Griffin et al. ............... 345/156 |
| 2006/0247915 A1 | 11/2006 | Bradford et al. |
| 2006/0282791 A1* | 12/2006 | Bogomolov et al. ......... 715/773 |
| 2007/0046641 A1* | 3/2007 | Lim .............................. 345/173 |
| 2007/0061753 A1 | 3/2007 | Ng et al. |
| 2007/0294636 A1* | 12/2007 | Sullivan ....................... 715/810 |
| 2008/0122796 A1 | 5/2008 | Jobs et al. |
| 2008/0167858 A1* | 7/2008 | Christie et al. ................. 704/10 |
| 2008/0303795 A1* | 12/2008 | Lowles et al. ................ 345/173 |
| 2009/0058823 A1* | 3/2009 | Kocienda ..................... 345/173 |
| 2009/0284472 A1* | 11/2009 | Mehta et al. ................. 345/169 |
| 2010/0079310 A1* | 4/2010 | Nachman et al. ............. 341/23 |
| 2010/0161538 A1* | 6/2010 | Kennedy et al. ............... 706/47 |

* cited by examiner

METHOD AND APPARATUS FOR TEXT ENTRY

This application claims the benefit of U.S. Provisional Patent Application Ser. No. 61/142,459 filed Jan. 5, 2009, titled "A SYSTEM FOR TEXT INPUT USING DIRECTIONAL INPUT DEVICES AND NUMERIC KEYPADS", the entire contents thereof being incorporated herein by reference.

FIELD OF THE INVENTION

This application is related generally to the field of text input, and more particularly to a method and apparatus for easing a user experience when entering such text, whether for conventional or less conventional text input devices.

BACKGROUND OF THE INVENTION

Modern gaming consoles, television set top boxes, televisions and other electronic devices with broadband access are becoming sophisticated and now may be provided with an ability to access the Internet, or other communication ability, and with a browser or other user-friendly interface program for reviewing information. These devices allow web browsing and various interactive features including social networking features and yet the hardware controllers and devices may not be suitable for such interactions. Chat has now become an integral part of the online gaming experience, and is also becoming important in the context of communicating with a friend or other third party when watching a movie or other television show when the parties are in remote locations, however joystick or gaming controllers are not exactly known to enable rapid and easy text input. There is a need for some innovation to enable interactive text entry using various consumer electronics devices. Thus, users may want to interact with each other through an electronic medium when they are playing each other in a game, perhaps reviewing single displayed information such as a series of photographs or the results of a search request, or when they are each watching the same movie or television show, but when they are not located physically near each other.

Current text input mechanisms for interactive TV and gaming typically provide a virtual keyboard where the user selects one key at a time to enter text. This is not necessarily an efficient mode of text entry. The input can be slow, tedious and annoying as the cursor moves from one key position to another. Such difficulties are magnified when such text input is being made to a non-traditional input device, such as using a remote control, joystick, gaming controller, scroll wheel, TV remote control, knob, or a small touch screen with a keyboard displayed thereon, or the like.

U.S. Pat. No. 7,202,853 issued to Ng et al. provides one approach to improving on this situation by providing a reduced number of keys, but retaining the typing map of a conventional QWERTY keyboard. A plurality of letters, numerals, symbols and functions are assigned to a set of data keys that are used by typist. While this solution does improve accuracy as a user need hit the reduced number of data keys, the '853 patent does not provide any added flexibility in providing an even further improved user experience.

Therefore, it would be beneficial to provide an improved text input method and apparatus that overcomes the drawbacks of the prior art.

SUMMARY OF THE INVENTION

In accordance with the present invention, a rapid text entry system and method are provided that leverage advanced and innovative error tolerant predictive text algorithms. The user can leverage the familiarity with QWERTY keyboard (or other common keyboard layouts) and input text using directional input on a joystick, 4 or 8 directional keypad (such as the ones found in TV remote control, telephones and mobile phones), various combinations of numeric keys on such a remote control or other available numeric keypad, or pointing functionality of such a remote control or other device, such as a Nintendo® Wii® remote or other wand like input device, body movement entry solutions, or the like.

The proposed system and method provide a means to rapidly enter text using the joystick on a gaming controller, available directional or number keys from a remote control, or other convenient input device such as scroll wheel or knob, and the like. This rapid and easier text input is achieved by providing the user with preferably nine, or other appropriate number of distinct keys that act as jump points. When the user moves the joystick in the direction of a jump point, or otherwise selects a jump point, the cursor is moved to that character. When a jump point is selected, a predetermined number of adjacent keys around the jump point are also selected, thus defining a zone associated with each jump point. This effectively selects the character that is highlighted and the other designated characters in its vicinity that are defined as being in the same zone. By way of example, if the letter Y is acting as a jump point, selection of such a Y jump point may also cause the letters R, T, U, and I to be selected and considered as valid inputs, for a total of five characters in the zone corresponding to the selection of the Y jump point. Thus, a user need only select between the number of jump points, and not be as precise as selecting each individual key. Innovative software is able to determine a desired selected word based upon the jump point selection sequence, rather than needing each individual key to be selected.

The number of jump points in turn defines the number of keys associated with each jump point. The more jump points, the fewer keys associated with each jump point. While this makes the algorithm for determining a desired word easier, it becomes more difficult for a user to properly designate the desired jump points. The fewer jump points, the easier it is for a user to select between them, but the more difficult for a computer algorithm to determine a desired word. While a balance must be struck between these two competing interests, some level of selection may be determined by the input device. A nine number keypad may lend itself to providing nine jump points, while a five direction input scheme (four directions and a center selection button such as that provided in, for example, a joystick, a remote control employing directional buttons, or another mobile device employing directional indicators) may lend itself to utilizing five jump points. Of course, zones need not all have the same number of keys associated therewith, the number of keys in each zone being determined in accordance with any number of techniques, including but not limited to geographic ease, linguistic considerations, frequency of use of each key, etc.

Furthermore, while predetermined jump points and corresponding associated keys comprise an embodiment of the invention, a more flexible solution is also contemplated in accordance with the invention. In such a further embodiment, any key may act as a jump point, and a number of surrounding keys may be dynamically selected and designated along with the selected key. This embodiment is most applicable to an environment utilizing, for example, a pointer such as a remote control or the like, a touch screen displaying a keyboard, or a body movement text entry system. As a user utilizes the pointer or touch screen over time, the device may begin to learn the characteristics of the user, thus anticipating errors that might be introduced by the user, and modifying the manner in which the keys associated with the selected key are dynamically assigned so as to reduce errors and make selection of a desired word easier and faster. Indeed, where appropriate, in accordance with the invention, displayed keys may be repositioned to aid in selection by a particular user. It is further contemplated that the layout of the keyboard may be changed up to further aid such a user in selection of desired words. Furthermore, in order to account for various error tolerance, the displayed keyboard and keys therein may not be precisely coextensive with the sensors used for determining touch. Thus, it may be possible that if a particular zone is displayed on a virtual keyboard may include spaces between keys, or even keys that are shown to be in another zone, such that that key may effectively be in two zones, even if displayed in one.

The invention is also applicable to any keyboard configuration, and language, and any other symbol grouping.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described, making reference to the following figures in which like reference numbers refer to like elements.

Figure 1:
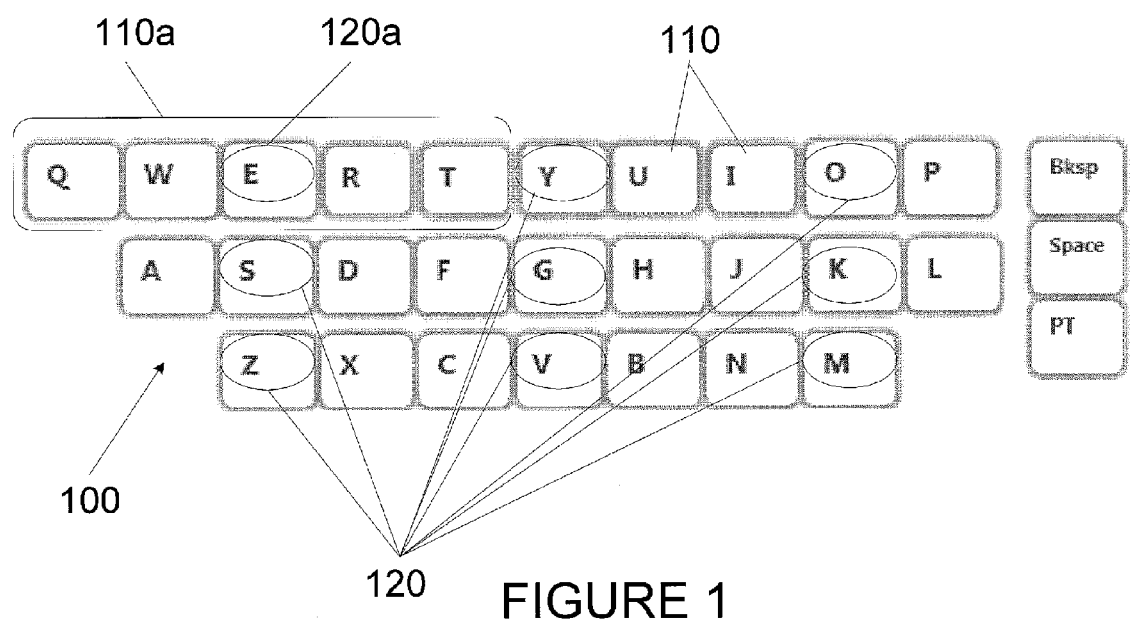
FIG. 1 is a graphical representation of a displayed keyboard, including jumper keys and a selected zone, constructed in accordance with an embodiment of the invention.

Referring first to FIG. 1, a first embodiment in accordance with the invention is shown. In FIG. 1, a keyboard, designated generally at 100, is provided with a plurality of keys 110. In this depicted embodiment, a 26 letter QWERTY keyboard is depicted. It should be understood by one of ordinary skill in the art that other keyboard configurations are available, including but not limited to other arrangements of the 26 English letter alphabet, arrangements of any other character set for use in other languages, any combination of numbers and/or letters, or any other desired combination of symbols of any kind. A predetermined number of these keys 110 are also designated as jump point keys 120. In the depicted embodiment, there are nine such jump keys, although any desired number may be employed. Each jump key 120 defines a zone comprising one or more letter keys associated therewith. As is further shown in FIG. 1, the "E" key, designated as 120a represents the jump key for a zone comprising the "E" key, and the other letter keys "Q", "W", "R", and "T", collectively designated at 110a. Thus, any time a user is interested in selecting any one of the five keys in this zone (110a or 120a), the user selects jumper key "E" and all of the keys in the zone are selected. While it is anticipated that each jumper key may be associated with a predefined, unique set of keys 110, it would be possible to have the zones overlapping, and indeed include one or more keys 110 in one or more zones. This may be beneficial depending on the particular input device employed, or based upon the particular characteristics of the user, and typical errors that he or she may typically make, or for other reasons.

Furthermore, while it is contemplated that all of the available symbol keys, in this case letters, be included within at least one zone, this need not be the case. Indeed, any particular key or keys may be left alone, requiring direct user selection. Such a configuration may be desirable for rarely-used keys, or keys with special significance that may be difficult to determine its desired selection based upon a parsing algorithm, as will be described below.

As can be understood from this description referring to FIG. 1, a user experience is eased as a user need not be as accurate when choosing a key entry, and indeed only has, in this particular depicted embodiment, nine keys to choose from, rather than a more traditional 26 letters. Of course, using a parsing algorithm that only has nine inputs, determining user intent may be assumed to be a bit more difficult in that the algorithm must choose a suggested word or words only knowing consecutive groups of letters selected, and not the actual letters selected. This assumption, however, may not be correct. Indeed, when selecting among 26 keys, any determination algorithm must consider the fact that the user may make a large number of input errors. While any algorithm must parse words, and having fewer input selections would tend to make this parsing more difficult, this may be counterbalanced with the fact that a user is less likely to make errors when entering information in a system employing the zone entry method and system in accordance with the invention.

In the particular embodiment as depicted in FIG. 1, a user interface might utilize a joystick with eight directional movement, and a center home position, each available position corresponding to a jumper key. Alternatively, a remote control or other device with a nine number keypad may be employed, each number corresponding to one of the jumper keys. Of course other configurations, including a joystick with less directional movement or a track ball with more, the same, or fewer degrees of freedom may be employed thus allowing a user to directionally move between jumper points. While requiring less hardware and learning, such a configuration may require two or more jumps when moving from one zone to another situated remotely on the input keyboard as movement may be limited to jumping between adjacent jumper keys. Alternatively, it may be possible to provide a scenario where a cursor or other pointer returns to a "home" or other designated zone or location after each letter entry. This feature has its benefits and drawbacks, providing a known start point for each text entry, but requiring multiple movements for double letters, etc.

When employing the eight direction joystick as noted above, the user can move between the jump points through movement of the joystick. Two or more schemes are possible. In a first, a valid movement of the controller may be Up, Down, Left, Right, Up-Right, Up-Left, Down-Right, and Down-Left. These eight distinct movements allow the user to quickly move between the keys on the keyboard, moving from jumper key to jumper key. A similar scheme may be employed with a less versatile four direction joystick. Without diagonal movements available, however, more jumps may be necessary for moving from one zone to another. In a second scheme, each of the eight directional keys and a central "neutral" position may each correspond to the nine jump points, allowing a user to directly access each of the jump points without having to navigate from one to the other. Alternatively, when, for example, a nine key number pad is provided, each number may correspond to a particular jumper key.

Figure 2:
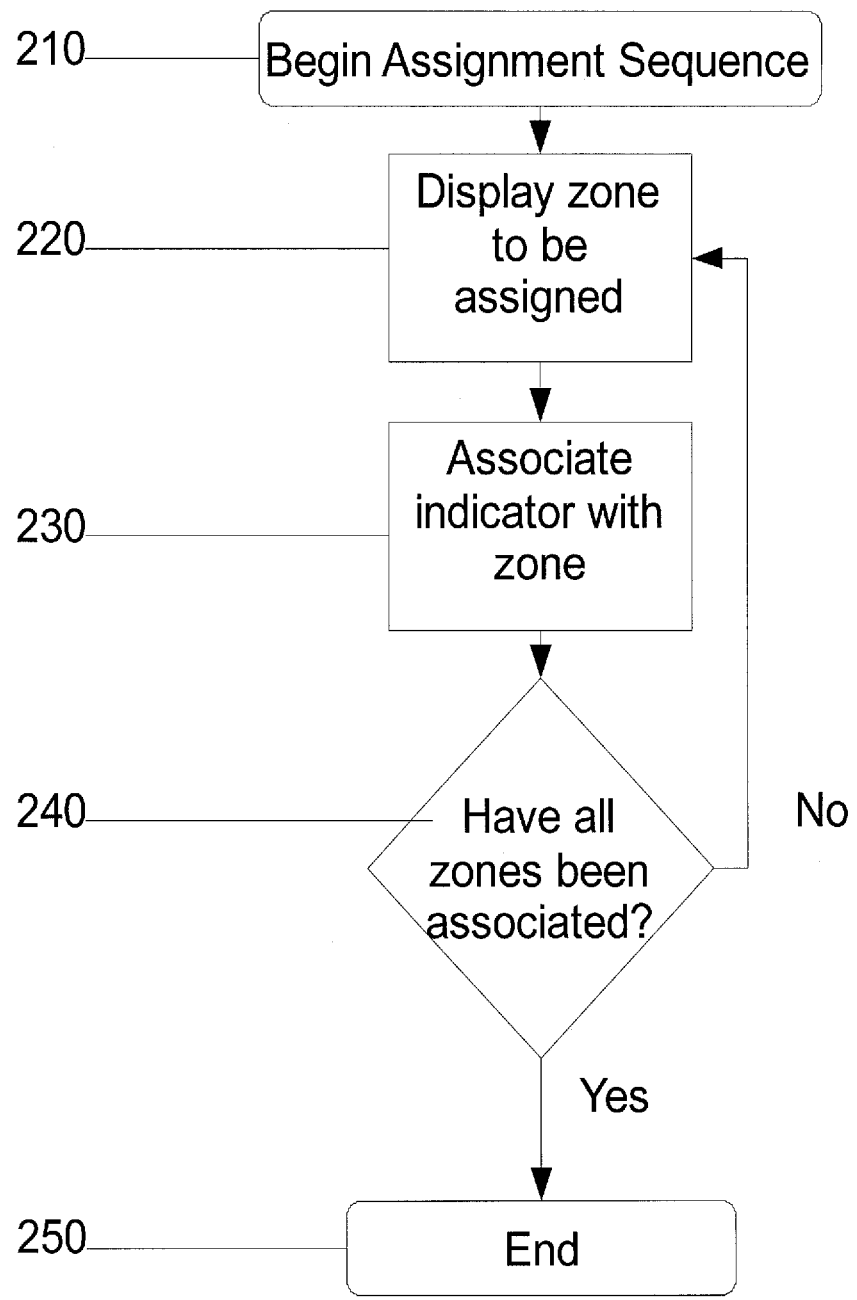
FIG. 2 is a flowchart diagram depicting a method for assigning available controller keys to predetermined zones in accordance with an embodiment of the invention.

While a most common option would be for these keys to be assigned based upon corresponding locations, in an alternative embodiment of the invention, it is possible to provide a learning mode where a user may assign a particular key (or joystick position, or the like) to one of the defined zones. Referring next to FIG. 2, in such a procedure at step 210 a user initiate an assignment sequence. At step 220 a first zone is identified on the display, and at step 230 a user is requested to designate a key, joystick direction, or other indicator, to correspond to the identified zone. At step 240 it is inquired whether all zones have been associated. If this inquiry is answered in the negative, and therefore all of the zones have not yet been associated, then control returns to step 220 so that additional zones may be assigned. This process is repeated for each predefined zone so that a user can personalize the experience and associate each zone with a desired indicator. If the inquiry at step 240 is answered in the affirmative, and therefore each zone has been associated, the sequence then ends at step 250.

Figure 3:
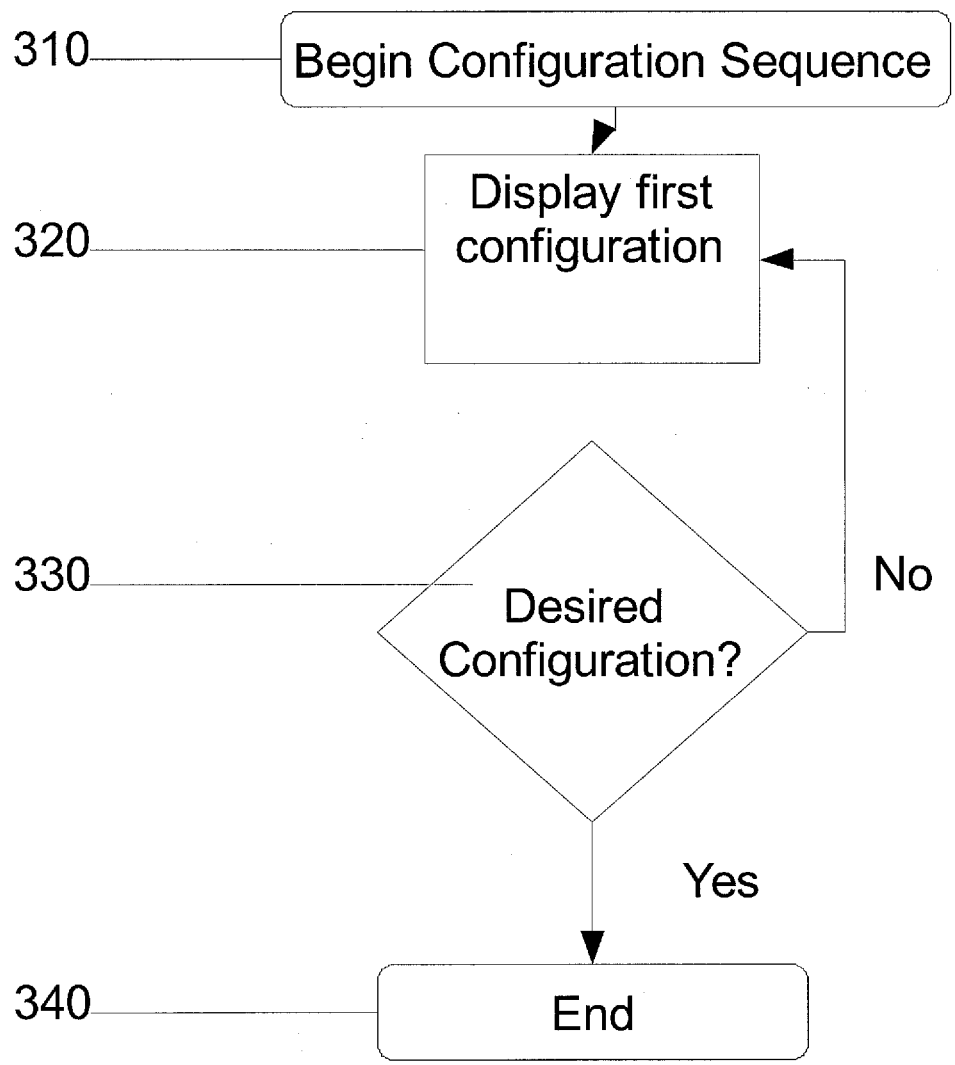
FIG. 3 is a flowchart diagram depicting a method or selecting among a plurality of stored configuration settings in accordance with an embodiment of the invention.
Figure 4:
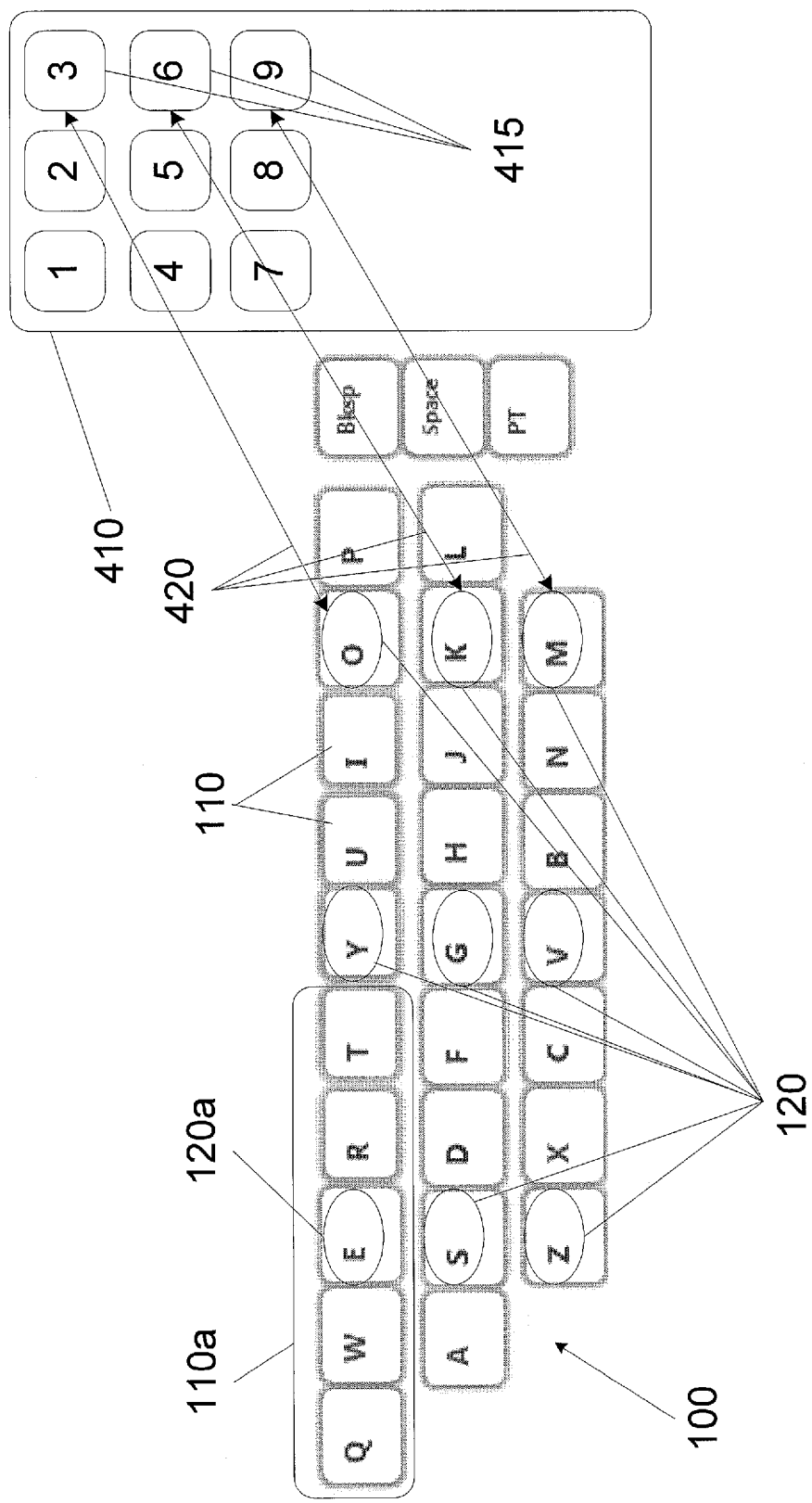
FIG. 4 depicts the mapping of a numeric keypad to jump points on a QWERTY keyboard in accordance with an embodiment of the invention.

While such a definition sequence may provide great flexibility, set up each time may be tedious for a user. Therefore, in accordance with the invention, each set up defined by a user may be stored for later access and use. Furthermore, in addition to storing such user defined configurations, any number of predefined configurations may also be stored for later recall and use by a user. As is shown in FIG. 3, a user is able to enter a configuration selection sequence at step 310. At step 320 a configuration setting is displayed. An example of such a display is shown in FIG. 4. As is shown in FIG. 4, jumper keys 120, 120a are shown, as well as keys associated therewith 110a, similarly to the display depicted in FIG. 1. Additionally, a key configuration 410 is shown, such as that may be included on a traditional remote control, telephone, or the like, indicating a mapping each key 415 thereof to one of the jumper keys 120, 120a. Such mapping may be indicated by a connecting lead line 420, color, shape, or any other desired indicator of relationship.

Referring once again to FIG. 3, at step 330 a user is asked whether the displayed configuration is the desired configuration. If the inquiry at step 330 is answered in the negative, and it is therefore determined that the displayed configuration is not the desired configuration, processing returns to step 320, and a next stored configuration is displayed. Such processing continues until the inquiry at step 33 is answered in the affirmative, and it is therefore determined that the currently displayed configuration is the desired configuration. Processing then ends at step 340.

In an additional embodiment of the invention, rather than making an indication on a remote device as described above to indicate zone selection, it may be possible to employ a pointing device, such as a remote control utilized with, for example, a NINTENDO® Wii® controller, body movement sensing to determine a user input, or the like. Thus, as a user points such a controller at a displayed virtual keyboard, or otherwise indicates zone selection, a zone pointed at by the controller is highlighted or otherwise indicated as being designated. A user can select such a zone by pressing an indicator on the remote, or by other method as is known to one of ordinary skill in the art. The use of zones in accordance with the invention is particularly useful in such a situation in that the ability to select each individual key may be difficult in such a configuration. Accuracy may be difficult. However, in accordance with the present invention, a user need only select between, for example, one of nine zones, thus making this ability to select much easier for a user. Thus, a user will likely be able to move through character selection in a much faster and easier manner. Zones in such a configuration may be assigned in any of the manners as described above.

Figure 5A:
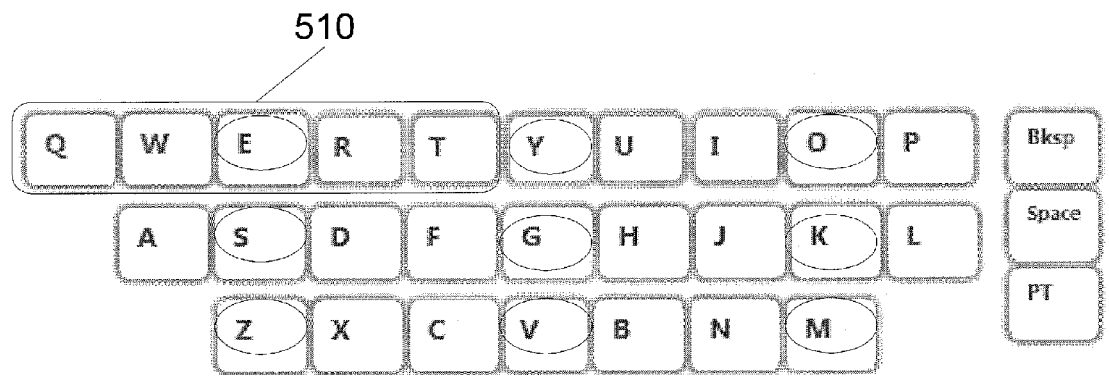
FIGS. 5A and 5B depict selection of zones employing a pointing device in accordance with an embodiment of the invention.
Figure 5B:
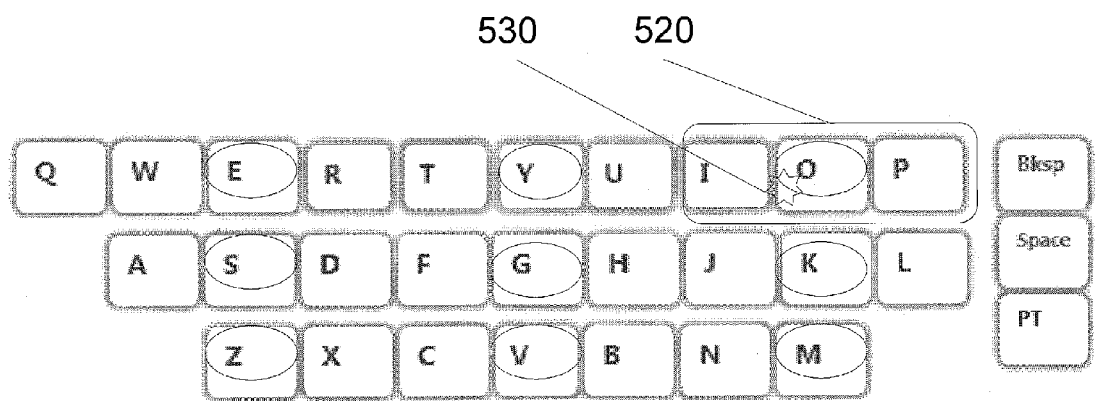

As is shown in FIGS. 5A and 5B, utilizing such a pointer device allows for easy selection of a desired zone. FIG. 5A depicts selection of a zone 510, such as that selected in FIG. 1. In FIG. 5B a zone 520, two zones to the right of the previously selected zone, is designated and selected. The user is able to make such a designation and selection simply by redirecting the pointing device. Preferably, an indicator 530 remains on the display to aid in locating the current position of the pointing device.

In addition to providing a visual indication of the remote pointing device moving from one displayed zone to another, in an alternative embodiment of the invention, a haptic or other tactile response is also provided to a user to provide an additional, non-visual indication of movement and selection. Thus, as a user moves the pointing device to designate a second zone, a vibration or other non-verbal indicator may be provided to the user. Thus, if as in the movement between FIGS. 5A and 5B a user moves the pointer two zones, such a haptic response may be provided to a user twice, once each time the border between zones is crossed. Such haptic response may also be modified, thus providing a different response for different zones. Thus, each zone may have a different haptic signature, or a zone determined by a parsing algorithm to be the most likely selected zone in the next selection may be provided a haptic indicator different from the other zones. The zones may be differentiated in any other manner including such a haptic indicator.

Figure 6:
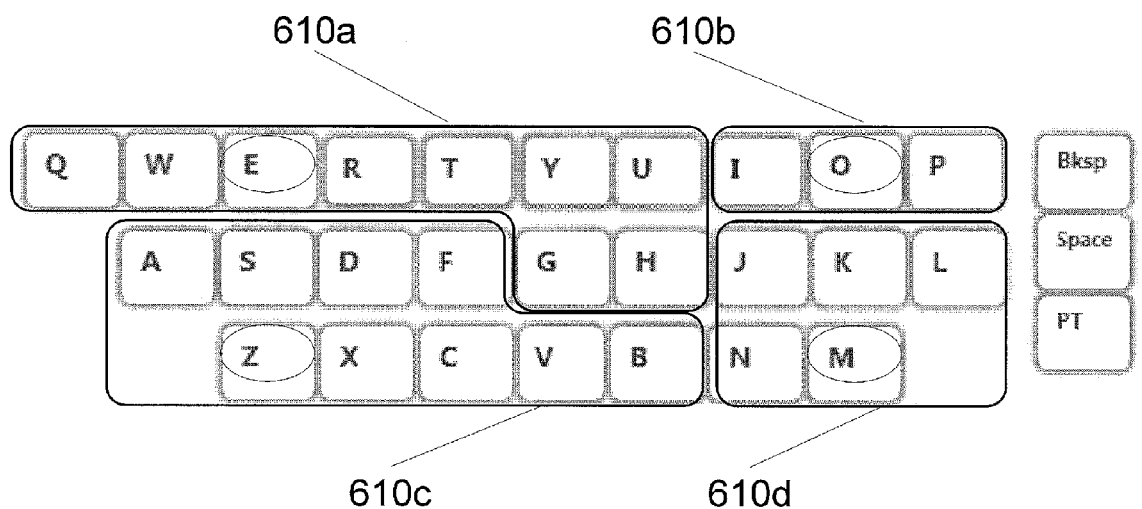
FIG. 6 depicts a reduced zone configuration in accordance with the invention.

Up to this point, the invention has been described with static zones, that is the keys associated with each jumper key in each zone is defined in advance. In an additional preferred embodiment, the zones may be dynamically defined, based upon any number of criteria. In a first application of dynamic zones, these zones may be at first predefined in a static manner. As a user enters characters by selecting zones, the number of zones may be reduced, and/or the makeup of the zones may be altered based upon the most likely selected words remaining possibilities in the dictionary being used. Thus, for example, if after entering characters by zones as set forth in FIG. 1 of the present invention, the parsing algorithm were to determine that there were only four possible words left, given the prior selection of zones by the user, the zones on the keyboard might be reduced to four, with a next letter for each of the four words being contained in a different zone, if possible. Such a configuration is shown in FIG. 6, depicting four zones 610 A, B, C and D. Then, the next selection by the user will define the selected word. While such a dynamic zone configuration may be applicable to any selection configuration, it would be most applicable in a pointing type of configuration, or (as will be described below) a touchscreen keyboard or the like, or any configuration without a predefined number of keys. As an alternative, rather than redefining the sign of the zones, it is contemplated in accordance with the invention that zones not containing a next possible letter be disabled, and thus be rendered unselectable by a user. While such a setup may be helpful to a user, there is no guarantee that each letter from the next set of words be in a different zone, and therefore may result in more than one additional selection be made by the user.

Zones may also be dynamically defined based upon one or more observed characteristics of a user interaction with the system. As a user makes selections of particular zones, a parsing algorithm is required to make a determination of the intended user input. In this process, the parsing algorithm will recognize input errors being made by the user. For example, a user intending to select a letter in zone 7 may always select zone 8. In such a situation, it may be beneficial for the zones to be reset to include such a letter in zone 8, thereby easing the parsing duties of the algorithm. In such a manner, the system is designed to learn the particular characteristics of a particular user or particular input device, and dynamically alter the zone definitions to match these characteristics. Such characteristics may include estimating which zone a user may have intended, based upon speed and direction of movement of, for example, a pointing device. Thus, a particular zone may be assumed, even if an adjacent zone were selected, based upon speed of movement of the pointer, and other characteristics of the user and/or dictionary.

In a most flexible embodiment of the invention, any key may act as a jumper key. Any key being pointed to by a pointer device or otherwise being indicated by a user may be provided as a jumper key, with a zone being formed around it. Thus, if a user tries to point and click words quickly, the user need only be approximate in the location of each key to be chosen. The number of keys in a zone may be determined dynamically, based upon the accuracy of the user. If the user is generally accurate, fewer keys can be included in each zone, therefore easing the difficulty in selecting the intended input word. If the user, however, is inaccurate with input, a greater number of keys can be included in the zones to be sure that the intended key is included in the selected zone. Of course, this may put a larger burden on a parsing algorithm as more letters will be indicated for each user selection.

It can also be recognized that depending on how a user may be handling a device may affect errors induced by a user. For example, when using a hand held device a user may hold the device with either hand, with both hands, or laying in a flat surface. The user may enter data with a single or two thumbs, or when the device is laying down on a flat surface, with one or more fingers. By employing the error-based modification of the zones noted above, and associating a different error scheme with each method of holding the device and data entry, a different dynamically controlled zone scheme may be provided to a user based upon how the device is being held or used. In this manner, and easier data entry system can be provided to a user.

Referring once again to FIG. 1, when a character corresponding to a particular jump point is selected on the user interface, a predetermined number of adjacent keys to the left and the right and/or above and below are highlighted along with the selected key, thus comprising a zone associated with the jumper key. This highlight lets the user know that not only will the selected jumper key be considered valid input, but the other highlighted characters as well.

Figure 7:
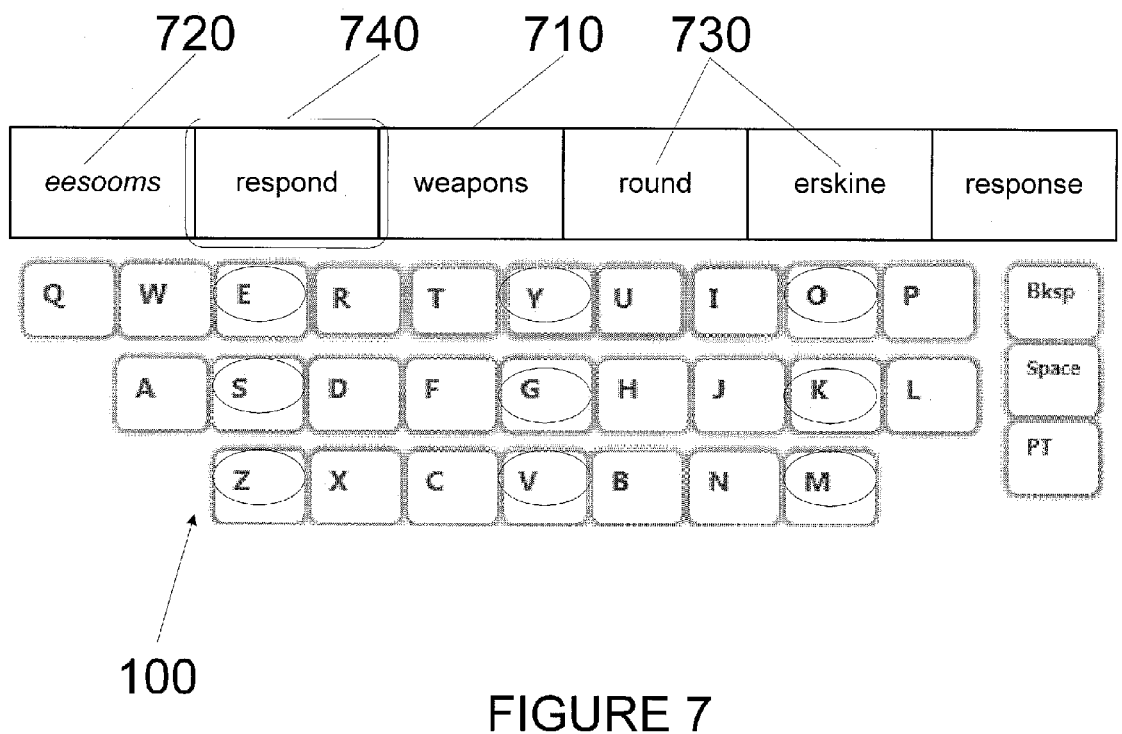
FIG. 7 depicts a word suggestion feature in accordance with an embodiment of the invention.

As the user selects the particular jumper key, all of the highlighted keys in the zone represented by the selected jumper key will be passed to a predictive text algorithm. The algorithm will return suggestions on potential word selections to the user that are then displayed on the screen, as is shown in FIG. 7 at 710. These word suggestions 730 are based upon the entered key sequence, taking into account all of the keys at each entry associated with the selected jumper key. At 720, the sequence of jumper keys selected by a user is shown. 740 depicts the most likely, or most common, word determined to be intended by the user. Selecting a suggested word will replace the entered word with the selected suggestion. Using other buttons on the input device such as the two bumper (left and right) buttons on the game joystick or any button on the TV remote the user can cycle through these suggested words to select the one the user wishes to use. If the predictive algorithm is unable to properly interpret and predict a user's intended word, a user is able to enter a direct text entry mode, and using directional keys or other standard joystick functionality to directly enter characters in a more traditional text entry mode. The user can train the system to add words to its dictionary or the system can be set to add words automatically after a preset number of times that the word has been entered.

An exemplary predictive text algorithm is depicted in, for example, co-assigned U.S. patent application Ser. No. 12/186,425 to Matthew Cecil, et al., filed Jun. 14, 2007 entitled "A PROBABILITY-BASED APPROACH TO RECOGNITION OF USER-ENTERED DATA", the entire contents thereof being incorporated herein by reference. Such an algorithm utilized in accordance with the present invention addresses the predictive text requirements of the invention. The user interface will pass the algorithm a character (or string of characters associated with a particular jumper point and zone) and the algorithm will interpret that character (or characters) and return a result to the user interface in the form of one or more suggested word selections, or may return an indication of an inability to properly parse out a word selection, indicating that the user has not yet entered enough letters as of yet. Of course, user context, history or the like may be employed to aid in such suggested word selection. Additionally, while the described predictive text algorithm may be employed, the present invention may be used with any appropriate text parsing or predictive text algorithm. As long as jump points can be associated with a number of different inputs, and these inputs can be differentiated from each other and used to select an intended input by a user, the invention may be employed.

Thus, using a matrix of probabilities the algorithm knows that for each character pressed the user could have meant characters to the left, right, above or below, or the other characters in the zone indicated in accordance with the invention as described above. Once the algorithm knows which characters are probable (based upon the keys associated with a selected jumper point, or alternatively, a dynamic or other determination of user intention. i.e. which letters it is likely the user intended, even if a predefined zone is not provided, the algorithm then runs a search against a dictionary, as is more completely described in the '425 application referenced above. Any words that match the string of probable characters are designated and then preferably scored based on distance between characters, frequency, probability, and any number of other characteristics that may be indicative of a user intention. The system can also adopt over time to give a higher probability of selection to frequently used patterns of a particular user. Thus, the prediction mechanism may be personalized for a particular user. Furthermore, in order to additionally aid in determining user intention, in accordance with the invention the predictive algorithm of the proposed system may, in addition to relying upon a traditional dictionary, attempt to further determine user intention by determining the context of a particular text input, such as determining whether the input is for an email, chat, search, or the like, or whether the text input is taking place during a particular television show, or while a music application is playing a song. To the extent a user is likely to use different words and/or other language differences, such context determination may aid in the accuracy of the predictive text algorithm. The algorithm may also receive information about information from stored content, the content of one or more databases, such as a user's contact list or the like, to improve the reliability of the prediction. Such context may be stored within a device being used for text entry, or may be stored remotely in a database accessible over the Internet, or other available network. The list of words is then sorted based on that score and returned to the user interface. Thus, the invention uses the redundancy in the input language or the possible input functionalities to map approximate input into non-ambiguous input per the user intention. Additionally, device features and functionality may be considered when determining user input, thus perhaps taking into account device limitations when determining such input.

As noted above, the displayed virtual keyboard represents a full QWERTY keyboard, but may comprise any other desired configuration. The jumper points may be preferably highlighted in a different color on the keyboard, or designated using some other distinguishing characteristic. When the input device is used to go to a jumper point, the optional characters around it (either designated as being in the zone represented by the selected jumper point, or based upon proximity to the selected key) are preferably highlighted as well to provide to the user visual feedback on the set of letters that are grouped with the selection of a particular jumper key. Optionally the system may highlight in different intensity or color the letters that are more probably intended by the user, based on its prediction algorithm. The regions around the jumper keys may be changed in size and in location, based on the dictionary and other probabilities taken into considerations by the prediction algorithm.

While the invention has been described as generally making reference to a joystick or remote control input device, any number of input devices, mechanisms, or schemes may be employed in accordance with the invention.

Figure 8:
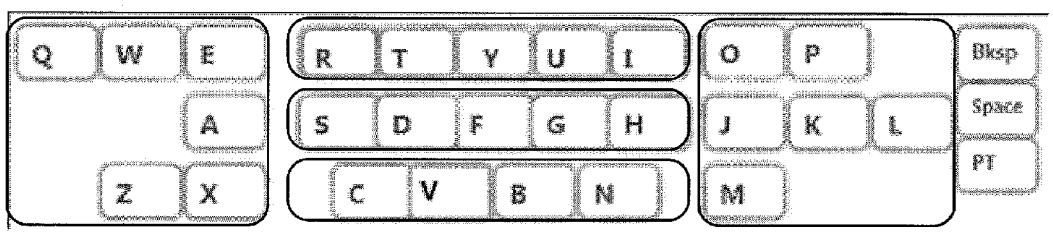
FIG. 8 depicts an alternative zone definition scheme in accordance with an alternative embodiment of the invention.

The invention may be applied to text input on a touch screen mobile phone interface, or touch screen on a remote control. In accordance with the invention, the user would only be required to touch one of the nine highlighted jumper keys to designate a zone of key choices. This would work similarly to the described embodiment employing the joystick or remote control described above, except the user would be touching the jumper keys instead of selecting them with a joystick. Additionally, once the zones are defined, it may only be necessary for a user to touch any key in a particular zone to select that zone, thus alleviating many problems associated with very small touch screen input devices. Furthermore, a custom designed touch screen layout or the like may be provided on a remote control of other indication device, such as that shown in FIG. 8. As is shown in FIG. 8, zones may include letters traditionally placed on different lines of a QWERTY keyboard. These zones may be defined in any manner, and may overlap, as noted above. Such a configuration may be employed to allow zones defined on a QWERTY keyboard to match a physical layout of buttons on a remote control or other input device, thus easing the user experience.

The invention is similarly applicable to text input on a traditional mobile phone with 9 or 12 key number pad or 4-directional key. The algorithm and interface in accordance with the invention may be modified so that the 9 jump keys on the keyboard are mapped to 9 number keys on the mobile phone or the 4-directional key is used in a similar way to a joystick. The invention may be applicable to use of a scroll type wheel, such as that provided on an Apple® Ipod® device. In such a situation, it may be beneficial to define zones in a circular configuration so that movement along the scroll wheel results in movement along a circle of zone selection.

The invention is further applicable to text input using a number pad on PC. The algorithm and interface in accordance with the invention may be modified so that the 9 jump keys on the keyboard are mapped to the 9 number keys on a computer's number pad, or may be mapped to a virtual number pad accessible with a mouse or other computer input device. Such a configuration is similar to that shown above in FIG. 4.

The invention may also be applied to a mobile or other device using a scrolling device, or otherwise comprising only one or two directional indication keys. With a scrolling device or one or two direction keys, the predefined zones are preferably provided with a predefined sequence, such as perhaps left to right, then top to bottom, so that upon scrolling or utilizing a directional key, a user is forwarded through each of the predefined zones, highlighting or otherwise indicating the presently selected zone. Pressing in the scrolling device, or other method of selection allows a user to choose the zone, and then scrolling is employed to move to a next zone for selection.

The invention may further be applied to a projected keyboard where various sensing mechanisms determine where a user touches a projected keyboard. As the accuracy of such sensing is likely difficult to determine, allowing a user to select from a smaller number of larger zones would be quite beneficial.

Therefore, in accordance with the invention, a generic device including any of the above embodiments such as the joystick and the like for inputs and a set of reference points with one highlighted such as the GUI is contemplated by the present invention. A data input system is provided such that a simplified input apparatus, preferably using legacy or existing devices such as a joystick, remote control handheld device, etc is used. Further, the system includes a set of reference points for data selection, and a method for indicating which of these data points is selected, preferably by highlighting on a GUI. Lastly, a method suitable for application in a machine or computer is implemented and associated with a controller of the system to facilitate the data input. In addition, a dictionary or look up table may be associated with the system to further facilitate the data entry.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed:

1. A method for data input, comprising the steps of:
   dividing an input selection device into multiple non-overlapping zones,
      wherein each non-overlapping zone includes two or more individual alphabetic or alphanumeric input selection indicators,
      wherein one of the alphabetic or alphanumeric input selection indicators in each non-overlapping zone is a jumper selector, and
      wherein the number of non-overlapping zones is less than the number of individual alphabetic or alphanumeric input selection indicators of the input selection device;
   receiving a user indication of two or more jumper selectors, wherein each jumper selector corresponds to a selected non-overlapping zone;
   collecting, into two or more characters sets, all of the individual alphabetic or alphanumeric input selection indicators associated with each selected non-overlapping zone;
   entering a sequence of the character sets into a parsing algorithm; and
   identifying, by the parsing algorithm and without further user input, one or more suggested words from a dictionary,
      wherein the identifying is based on the sequence of character sets.

2. The method of claim 1, wherein each alphabetic or alphanumeric jumper selector is an alphanumeric keyboard button on the input selection device associated with a non-overlapping zone, and wherein receiving a user indication of a jumper selector comprises the user pressing the button.

3. The method of claim 1, wherein the input selection device is a virtual keyboard or diagram comprising numbers and symbols of an alphabet; and wherein the user indication of two or more jumper selectors is received via a user input device configured to select portions of the virtual keyboard or diagram.

4. The method of claim 1, wherein the input selection device is a keyboard with push-button characters.

5. The method of claim 1 further comprising:
   determining an intended word input, from among the one or more suggested words, based on the sequence of character sets.

6. The method of claim 1, wherein each jumper selector is associated with a particular input button on a remote device.

7. The method of claim 1, wherein each jumper selector may be selected by pointing at the jumper selector with a pointing device.

8. The method of claim 7, wherein a haptic response is provided to a user when the pointing device is moved onto or off of a jumper selector.

9. The method of claim 1, wherein each jumper selector may be selected, in part, by a direction indication from a joystick or a group of directional keys.

10. The method of claim 1, wherein the input selection device is a QWERTY keyboard.

11. The method of claim 1, further comprising:
    determining one or more errors in the user indication of a jumper selector; and
    modifying the set of alphabetic or alphanumeric characters in accordance with the determined one or more errors.

12. The method of claim 1, wherein the jumper selector for at least one non-overlapping zone is predetermined.

13. The method of claim 1, wherein at least one of the multiple non-overlapping zones is user defined.

14. The method of claim 1 further comprising dynamically modifying one or more non-overlapping zones based on input characteristics of a user.

15. The method of claim 1 wherein some individual alphabetic or alphanumeric input selection indicators are not included in a non-overlapping zone and require specific selection by the user.

16. The method of claim 1, wherein the multiple non-overlapping zones are based on how an input device is being held or used by the user.

17. A system for data input comprising:
    an input selection device divided into multiple non-overlapping zones, each non-overlapping zone including two or more individual alphabetic or alphanumeric input selection indicators,
       wherein at least one of the alphabetic or alphanumeric input selection indicators in each non-overlapping zone is a jumper selector, and
       wherein the number of non-overlapping zones is less than the number of individual alphabetic or alphanumeric input selection indicators of the input selection device;
    a jumper choosing device configured to receive a user indication of two or more jumper selectors,
       wherein each jumper selector selects a non-overlapping zone; and
    a collection device configured to determine two or more sets of alphabetic or alphanumeric characters,
       wherein each set of alphabetic or alphanumeric characters is associated with one of the received two or more jumper selectors;
    a sequencing component configured to enter the two or more sets of alphabetic or alphanumeric characters as a sequence; and
    a parsing component configured to receive the sequence of two or more sets of alphabetic or alphanumeric characters and identify, without further user input, one or more suggested words from a dictionary,
       wherein the identifying is based on the sequence of two or more sets of alphabetic or alphanumeric characters.

18. The system of claim 17, wherein each alphabetic or alphanumeric jumper selector is an alphanumeric keyboard button on the input selection device associated with a non-overlapping zone, and the receiving a user indication of a jumper selector comprises the user pressing the button.

19. The system of claim 17, wherein the input selection device is a virtual keyboard or diagram comprising numbers and symbols of an alphabet; and wherein the user indication of two or more jumper selectors is received via a user input device configured to select portions of the virtual keyboard or diagram.

20. The system of claim 17 further comprising:
    a word selector configured to determine an intended word, from among the one or more suggested words, based on the sequence.

21. The system of claim 17, wherein the alphabetic or alphanumeric input selection indicators associated with each possible non-overlapping zone are predetermined.

22. The system of claim 17 wherein one or more of the overlapping zones is dynamically modified based on input characteristics of a user.

23. The system of claim 17, wherein the multiple non-overlapping zones are based on how an input device is being held or used by the user.

24. A non-transitory computer-readable storage medium, storing instruction that, when executed by a computing device, cause the computing device to perform operations comprising:

dividing a portion of an input selection device into multiple non-overlapping zones, each non-overlapping zone including two or more individual alphabetic or alphanumeric input selection indicators, wherein at least one of the alphabetic or alphanumeric input selection indicators in each non-overlapping zone is a jumper selector, and wherein the number of non-overlapping zone is less than the number of individual alphabetic or alphanumeric input selection indicators in the portion of the input selection device;

receiving a user indication of two or more jumper selectors, each jumper selector corresponding to a selected non-overlapping zone; and collecting, into two or more characters sets, all of the individual alphabetic or alphanumeric input selection indicators associated with each selected non-overlapping zone entering a sequence of the character sets into a parsing algorithm; and identifying, by the parsing algorithm and without further user input, one or more suggested words from a dictionary, wherein the identifying is based on the sequence of character sets.

25. The non-transitory computer-readable storage medium of claim 24, wherein each jumper selector is associated with a particular input button on a remote device.

26. The non-transitory computer-readable storage medium of claim 24, wherein each jumper selector may be selected by pointing at the jumper selector with a pointing device.

27. The non-transitory computer-readable storage medium of claim 24, further storing instructions that, when executed by the computing device, cause the computing device to execute operations comprising:

determining one or more errors in the user indication of a jumper selector; and modifying the set of alphabetic or alphanumeric characters in accordance with the determined one or more errors.

28. The non-transitory computer-readable storage medium of claim 24, wherein the alphabetic or alphanumeric input selection indicators associated with each possible non-overlapping zone are predetermined.

29. The non-transitory computer-readable storage medium of claim 28 wherein some individual alphabetic or alphanumeric input selection indicators are not included in a non-overlapping zone and require specific selection by the user.

30. The non-transitory computer-readable storage medium of claim 24, further storing instructions that, when executed by the computing device, cause the computing device to execute operations comprising dynamically defining non-overlapping zones based on criteria including words most likely to be selected, or common mistakes of, the user, and estimating which non-overlapping zone the user intended based on input speed and direction.

31. The non-transitory computer-readable storage medium of claim 24, wherein the input selection device is a virtual keyboard, and wherein the user indication of two or more jumper selectors is received via a user input device configured to select portions of the virtual keyboard or diagram.

* * * * *